United States Patent
Ishida et al.

(10) Patent No.: US 7,903,174 B2
(45) Date of Patent: Mar. 8, 2011

(54) BROADCASTING DATA RECEIVING APPARATUS

(75) Inventors: Kenichi Ishida, Tokyo (JP); Michio Miyano, Kanagawa (JP); Tamiya Tanaka, Tokyo (JP)

(73) Assignee: Sony Corporation (JP)

( * ) Notice: Subject to any disclaimer, the term of this patent is extended or adjusted under 35 U.S.C. 154(b) by 1216 days.

(21) Appl. No.: 11/508,464

(22) Filed: Aug. 23, 2006

(65) Prior Publication Data

US 2007/0070246 A1 Mar. 29, 2007

(30) Foreign Application Priority Data

Aug. 24, 2005 (JP) ................ P2005-242886

(51) Int. Cl.
*H04N 11/00* (2006.01)
*H04N 7/00* (2006.01)

(52) U.S. Cl. ......... 348/465; 348/461; 348/552; 725/152; 725/140

(58) Field of Classification Search .......... 348/460–468, 348/473, 552, 553, 725; 725/50, 152, 140
See application file for complete search history.

(56) References Cited

U.S. PATENT DOCUMENTS 7,512,895 B2 * 3/2009 Snover et al. ............... 715/772
2003/0135858 A1 * 7/2003 Nemoto ...................... 725/75

FOREIGN PATENT DOCUMENTS

JP 2005-050097 A 2/2005

* cited by examiner

*Primary Examiner* — M. Lee
(74) *Attorney, Agent, or Firm* — Lerner, David, Littenberg, Krumholz & Mentlik, LLP

(57) ABSTRACT

A broadcasting data receiving apparatus which can receive broadcasting data and update software by using software update data received as the broadcasting data includes a receiving portion operable to receive broadcasting data, a video/audio processing portion operable to process video data included in the received broadcasting data for video display and audio data included in the received broadcasting data for audio output based on stored software, an operation input portion operable to receive a user operation, and a control portion operable to (i) control the processing in the video/audio processing portion, (ii) perform software update processing on a necessary component by using received software update data if the received broadcasting data includes the software update data, and (iii) perform minimal display processing or minimal audio output processing in the video/audio processing portion if the operation input portion receives a user operation to start the apparatus during execution of the update processing.

3 Claims, 3 Drawing Sheets

PROCESSING EXAMPLE FOR UPDATING SOFTWARE

DISPLAY EXAMPLE

DISPLAY EXAMPLE

BROADCASTING DATA RECEIVING APPARATUS

CROSS-REFERENCE TO RELATED APPLICATIONS

The present application claims priority from Japanese Patent Application No. JP2005-242886 filed on Aug. 24, 2005, the disclosure of which is hereby incorporated by reference herein.

BACKGROUND OF THE INVENTION

1. Field of the Invention

The present invention relates to a broadcasting data receiving apparatus, which may be suitable for use in a televisor receiving digital broadcasting, and, in particular, a technology updating software installed in the receiving apparatus.

2. Description of the Related Art

In the past, internal software may be updated by using received data in a televisor internally containing a digital broadcasting receiving tuner that receives digital broadcasting or a single digital broadcasting receiving apparatus. In other words, in a data broadcasting system that digitizes and transmits video data and/or audio data, software update data of a televisor (receiving apparatus) can be multiplexed to broadcasting data and be transmitted from a broadcasting station side so as to improve the functionality of the televisor and/or correct a problem in software.

Upon receipt of software update data, the televisor (receiving apparatus) side that receives the broadcasting data stores the received software update data in an internal memory and performs a process of updating (correcting) software within the apparatus by using the stored update data.

The televisor side having received the software update data starts the update processing when the televisor is turned off first after the completion of the receipt of the update data.

JP-A-2005-50097 discloses the process of updating software (firmware).

Since the software update by using broadcasting data is performed independent of the intention of a user who owns the televisor, the televisor may operate at midnight to perform the update processing. During the update processing, a notification that the update is in progress may be given to a user by, for example, causing a pilot lamp including a light-emitting diode to blink. However, the update processing itself is rarely performed, and the user may hardly notice the fact.

If a user powers on the televisor during the update processing, the televisor cannot perform the process of receiving television broadcasting because of the update processing in progress, resulting in no image display and/or audio output relating to a broadcasted program. Then, the user who does not know that the update processing is in progress may misunderstand that the televisor may have a problem, resulting in the performance of an unnecessary operation. For example, if, in the worst case, the user unplugs the televisor, the software update processing may be interrupted in the middle. As a result, the correction of the software may be left incomplete.

Accordingly, it is desirable that a software update to be performed by receiving broadcasting data can be notified to a user well.

SUMMARY OF THE INVENTION

According to an embodiment of the invention, software update processing is performed on a necessary component by using received software update data if the received broadcasting data includes the software update data, and minimal display processing or minimal audio output processing is performed in a video/audio processing portion if an operation input portion receives a user operation to start the apparatus thereof during the execution of the update processing.

Thus, a notification that a software update is in progress may be given to a user by minimal display processing or audio output processing in response to a user operation to start the apparatus thereof during the execution of software update processing.

According to embodiments of the invention, the notification that a software update is in progress may be given to a user by minimal display processing or audio output processing. Therefore, the user having performed an operation such as powering-on may notice the fact that the display of the received image and/or the audio output is disabled because a software update is in progress and therefore not incorrectly determine there is a problem in the apparatus.

DETAILED DESCRIPTION

With reference to drawings, embodiments of the invention will be described below.

Figure 1:
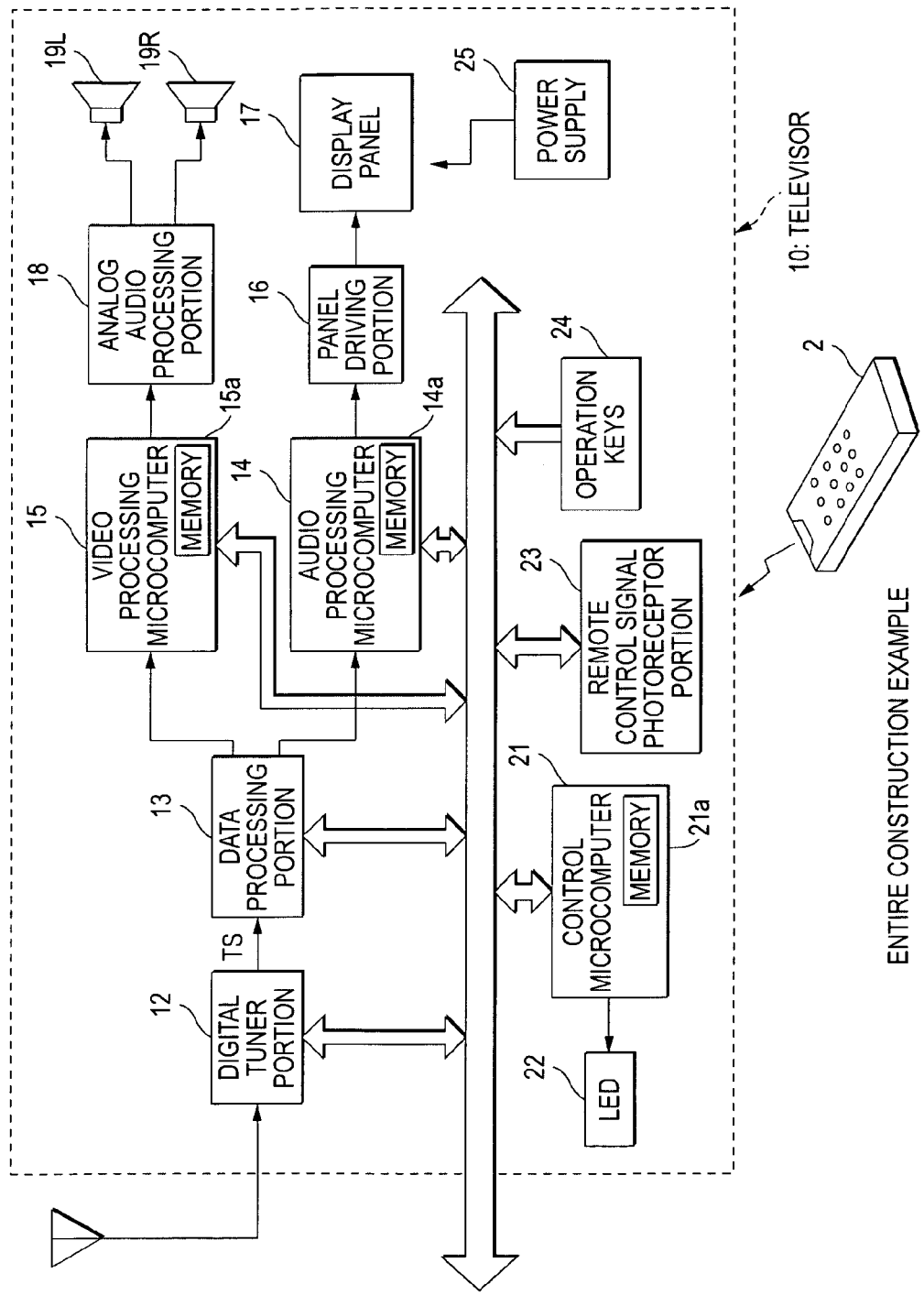
FIG. 1 is a block diagram showing a construction example according to an embodiment of the invention.

This embodiment is applicable to a televisor that receives and televises digital broadcasting (digital satellite broadcasting or digital terrestrial broadcasting). FIG. 1 is a diagram showing a construction of a televisor 10 of this embodiment. An antenna 1 connects to a digital tuner portion 12 within the televisor 10. The digital tuner portion 12 receives and demodulates the frequency at which broadcasting waves are transmitted through a predetermined broadcasting channel and obtains a transport stream TS, which is transmission data at the frequency. The receiving frequency (receiving channel) in the digital tuner portion 12 is set by an instruction from a control microcomputer portion 21, which will be described later.

The transport stream TS obtained by the digital tuner portion 12 is supplied to a data processing portion 13. The data processing portion 13 demultiplexes the supplied transport stream TS into video data and audio data, for example, and supplies the demultiplexed video data to a video processing microcomputer portion 14 and audio data to an audio processing microcomputer portion 15. The data processing portion 13 supplies data excluding video data and audio data, if received, to the control microcomputer portion 21 that controls operations of the televisor.

The video processing microcomputer portion 14 may create video data for display by decoding supplied video data and/or performing video processing (such as quality increasing processing and added information display processing) relating to the decoded video data. The video processing microcomputer portion 14 includes a non-volatile and overwritable memory 14a, and the memory 14a stores software functioning as a video processing program.

The video data output by the video processing microcomputer portion 14 is supplied to a display panel driving portion 16. The display panel driving portion 16 drives the display of a display panel 17 including an image display panel such as a liquid crystal display panel and causes the display panel 17 to display an image.

The audio processing microcomputer portion 15 may perform audio data processing such as the demodulation and analog conversion on supplied audio data and output an analog audio signal. The audio processing microcomputer portion 15 includes a non-volatile and overwritable memory 15a. The memory 15a stores software functioning as an audio processing program. The analog audio signal output by the audio processing microcomputer portion 15 is supplied to an analog audio processing portion 18. The analog audio processing portion 18 performs analog processing such as amplification thereon and causes speakers 19L and 19R connecting thereto to output the audio data.

The control microcomputer portion 21 that controls operations of components of the televisor is configured to perform data transfer with the other microcomputer portions 14 and 15, the tuner portion 12, the digital processing portion 13 and so on via a bus line. The control microcomputer portion 21 also includes a non-volatile and overwritable memory 21a, and the memory 21a stores software functioning as a control program. The control processing to be performed by the control microcomputer portion 21 includes control over basic operations as a televisor such as control over a receiving channel and control over the video display state and control over the audio output state and control processing over functions of the televisor such as the receipt of electronic program information (EPG: Electronic Program Guide) included in broadcasting data and the display of a program table and guide information based on the received and stored electronic program information. The received electronic program information is also stored in the memory 21a.

A light-emitting diode (or LED) 22 is connected to the control microcomputer portion 21 and notifies the operational state of the televisor by the lighting (blinking) of the light-emitting diode 22. For example, a green lamp lights up when the televisor is on while a red lamp lights up at a standby state. The "standby state" here refers to the state that no processing such as display is performed in the televisor but minimal circuits such as a control circuit block are receiving power supply to operate such that the power can be turned off by an instruction from a remote controller 2, which will be described later. The red lamp may blink, for example, during software update processing, which will be described later.

The televisor 10 of this embodiment includes a remote control signal photoreceptive portion 23 and an operation key portion 24 functioning as operation input portions to receive a user operation. The remote control signal photoreceptive portion 23 receives a remote control signal (such as an infrared signal) transmitted from the remote controller 2 and supplies the received control code to the control microcomputer portion 21. The code based on an operation on the operation key portion 24 is also supplied to the control microcomputer portion 21. The operation key portion 24 includes a channel select key, a sound level adjusting key, an input switching key, a power supply key and so on.

A power supply circuit 25 included in the televisor 10 of this embodiment is configured to supply power to a necessary component under the control of the control microcomputer portion 21. In other words, the power supply circuit 25 is configured to supply power to components within the televisor at a normal power-on state. However, at the standby state, the power supply circuit 25 is configured to supply power to a necessary circuit block to operate in accordance with the processing to be performed at the standby state.

The software stored in the memories 14a, 15a and 21a in the microcomputer portions 14, 15 and 21 in the televisor 10 of this embodiment is written in the process of manufacturing the televisor 10. However, the software stored in the memories 14a, 15a and 21a can be updated by external input of software update data. The software update data can be obtained from data added to the broadcasting data received by the tuner portion 12, for example. The software update processing starts when the televisor is turned to the standby state after the completion of the receipt of software update data for the type of the televisor and the storage of the received software update data in the memory 21a of the control microcomputer portion 21.

Once the software update processing starts, necessary software update data is supplied from the control microcomputer portion 21 to the microcomputer portions 14 and 15, and the update processing is performed on the software stored in the memories 14a and 15a within the microcomputer portions 14 and 15. The software stored in the memory 21a within the control microcomputer portion 21 is updated as required. During the software update processing, a special command for update processing is transmitted from the control microcomputer portion 21 to the microcomputer portions 14 and 15, whereby processing associated with the update processing is performed.

Next, referring to the flowchart in FIG. 2, a processing example will be described which is to be performed in the televisor 10 of this embodiment during the software update processing by using received software update data added to broadcasting data.

First of all, when the operational state of the televisor 10 is turned to the standby state after the completion of the receipt and storage of software update data in the memory 21a, the control microcomputer 21 determines whether the software update is to be started or not (step S11). If the update is not to be started, the processing moves to step S26 with the standby state maintained.

If it is determined in step S11 that the update is to be started, the blinking of the light-emitting diode 22 is started (step S12), and the update processing is started. Then, whether the update processing has completed or not is determined (step S13). If the update processing has completed, the blinking of the light-emitting diode 22 is turned off (step S14), and the operational state is turned to the standby state (step S26). If it is determined in step S13 that the update processing has not completed, whether power-on code (which is code for starting the televisor) has been received from the remote controller or not is determined (step S15). If no power-on code has received, the processing returns to the determination on the completion of the update in step S13. If it is determined in step S15 that the power-on code has received, whether software update processing in the control microcomputer portion 21 is in progress or not is determined (step S16). If software update is being performed on an applicable component, the processing directly returns to the determination in step S13.

If it is determined in step S16 that software update processing is in progress in the other portion than the control microcomputer portion 21, the televisor is powered on (step S17) under the control of the control microcomputer portion 21. The powering-on here is for performing a minimal operation as described later and is not the normal powering-on. Then, whether the update processing has completed or not is determined (step S18). If the update processing has completed, the blinking of the light-emitting diode 22 is turned off (step S24), which is followed by the power-on state for powering on the televisor (step S25). The power-on state here is the normal powering-on processing for receiving and displaying the last viewed channel.

If it is determined in step S18 that the update processing has not completed, whether software update processing is in progress in the video processing microcomputer portion 14 or not is determined (step S19). If the update processing is in progress, the processing returns to the determination on the completion of the update processing in step S18. If it is determined in step S19 that the software update processing is not in progress in the video processing microcomputer portion 14, a command is transmitted from the control microcomputer portion 21 to the video processing microcomputer portion 14 to perform processing of causing the display panel 17 to display text indicating that software is being updated (step S20). The display processing may be performed by using a function for displaying guide text of the video processing microcomputer portion 14.

Figure 3:
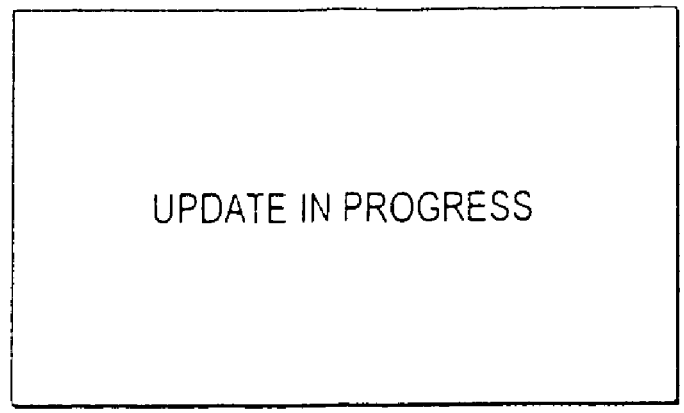
FIG. 3 is an explanatory diagram showing a display example according to the embodiment of the invention.

FIG. 3 is a diagram showing a display example providing a minimal display of the text, "UPDATE IN PROGRESS", which indicates software update processing is in progress. The text is displayed entirely over a background in monotonous color, and the tuner portion 12 does not receive anything so that no received pictures can be displayed.

Figure 2:
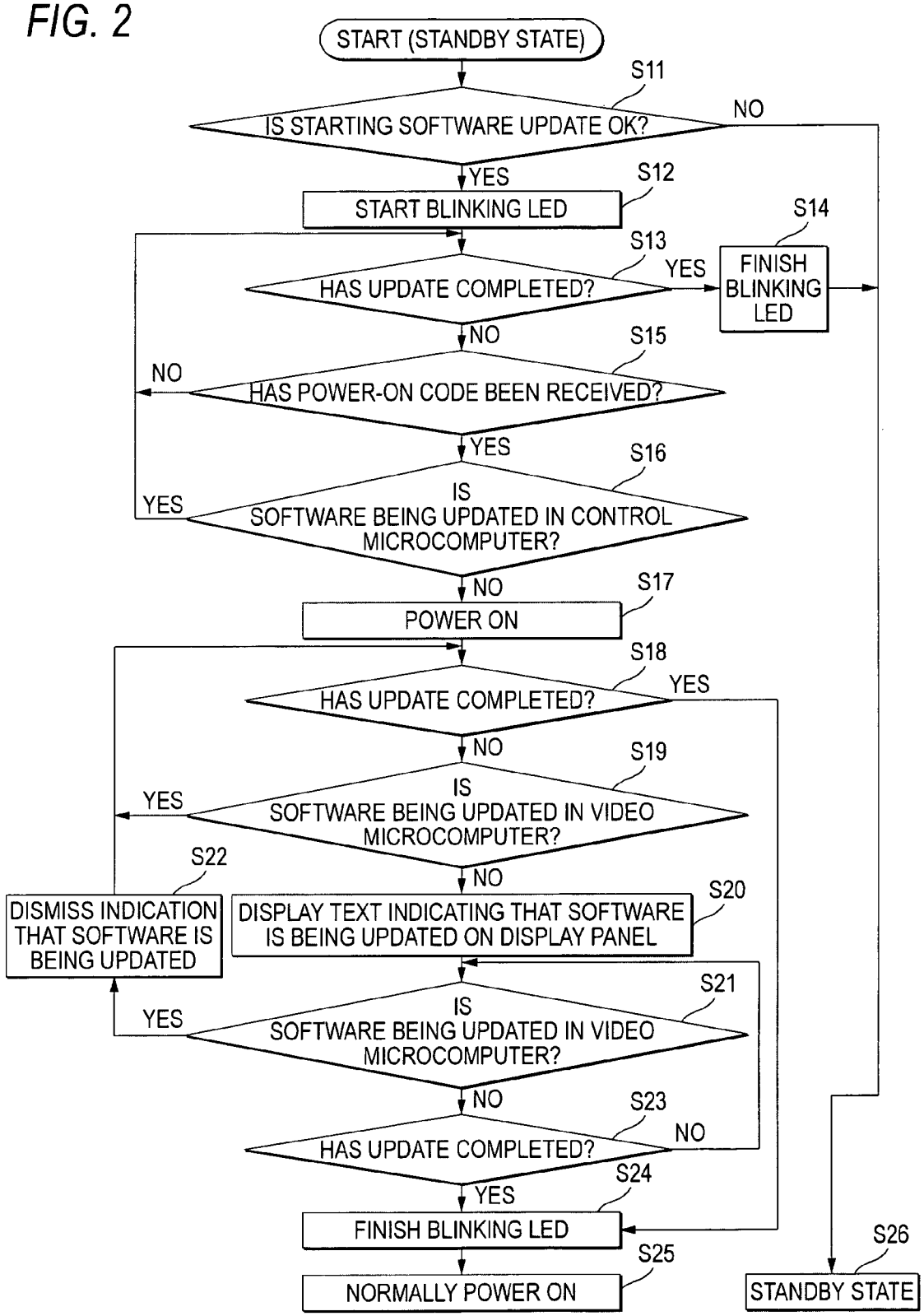
FIG. 2 is a flowchart showing a software update processing example according to the embodiment of the invention.

Referring back to the flowchart in FIG. 2, whether the software update processing in the video processing microcomputer portion 14 has been started or not is further determined (step S21) with the display in step S20. If the corresponding update processing has not been started, whether all software update processing has completed or not is determined (step S23). If the update processing has not been completed, the processing returns to the determination in step S21. If all update processing has completed, the blinking of the light-emitting diode 22 is turned off (step S24), which is followed by the power-on state for powering on the televisor (step S25).

If the determination in step S21 results in the fact that the software update processing in the video processing microcomputer portion 14 has been started, the text display, which has been started in step S20, is turned off, and nothing is displayed (step S22). Then, the processing returns to the determination in step S18.

By performing the processing during the software update processing in this way, the update processing is started when the televisor is at the standby state. However, in response to a user operation for starting the televisor during the update processing at the standby state, the user is notified that powering-on is inhibited since software update is in progress by a minimal display indicating that software update is in progress in accordance with a command transmitted from the control microcomputer portion 21 to the video processing microcomputer portion 14 at least during software update processing in the processing portion, which is not the processing portion (video processing microcomputer portion 14) relating to the display. Thus, the improper determination of a problem by the user can be effectively prevented. Though the text indicating that software update is in progress is turned off during the software update processing in the video processing microcomputer portion 14, which is the processing portion directly relating to the display, the display is turned on during the software update processing on other components. Thus, the corresponding display is turned on by using the original display function of the televisor as much as possible, and the state notification can be given to a user well.

Figure 4:
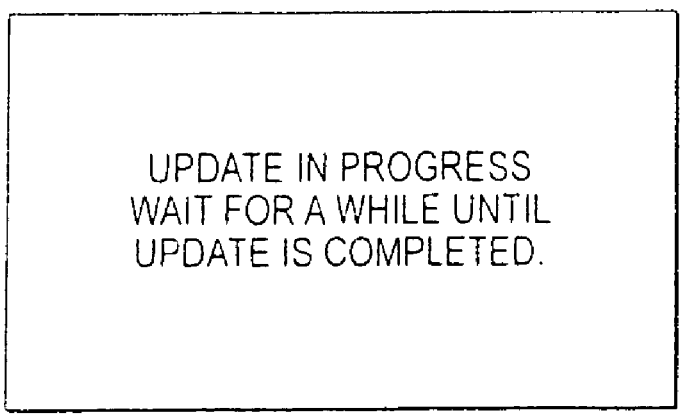
FIG. 4 is an explanatory diagram showing a display example according to another embodiment of the invention.

While, in the example in FIG. 3, the simpler display, "UPDATE IN PROGRESS", is video-displayed, details of the current update state may be displayed. For example, as shown in FIG. 4, the text, "UPDATE IN PROGRESS. WAIT FOR A WHILE UNTIL UPDATE IS COMPLETED", may be displayed instead. Alternatively, the text notifying that the display indicating the update is in progress will be turned off as the update processing advances may be displayed at the same time.

While the video display of "UPDATE IN PROGRESS" notifies a user the fact that software is being update in the processing described up to this point, a synthesized voice output, "UPDATE IN PROGRESS", from a speaker may notify the fact when the powering-on operation is performed during software update processing. In order to provide the voice output from a speaker, the audio processing microcomputer portion may create synthesized voice data and supply the voice data (audio data) to the analog audio processing portion 18. The analog audio processing portion 18 is powered by the power supply circuit 25 also during the software update processing, whereby the corresponding output processing may be performed. Alternatively, both of the video display such as "UPDATE IN PROGRESS" and the voice output processing of the notification may be provided. Furthermore, the combination of the video display such as "UPDATE IN PROGRESS" and the notification voice output processing may be provided. For example, the notification processing may be performed by voice output during software update processing in the video processing microcomputer while the notification processing may be performed by video display during software update processing in the other microcomputer.

Having described the televisor using a liquid crystal display as a display panel, for example, according to this embodiment, the televisor may include a display portion under other display principle. Alternatively, software installed in a single digital broadcasting data receiving apparatus with no display portion may be updated by the processing as described above. In this case, a display apparatus that receives the input of a video signal output from the receiving apparatus may display the text, "UPDATE IN PROGRESS", or an audio apparatus that receives the input of an audio signal output from the receiving apparatus may output voice, "UPDATE IN PROGRESS".

While, in the system construction according to the embodiment, the memory storing software to be updated is provided separately in each of the microcomputer portions, all of programs of the software may be stored in a memory of a predetermined component within the apparatus, and the microcomputer portions may be operated based on the programs.

It should be understood by those skilled in the art that various modifications, combinations, sub-combinations and alterations may occur depending on design requirements and other factors insofar as they are within the scope of the appended claims or the equivalents thereof.

The invention claimed is:

1. A broadcasting data receiving apparatus which can receive broadcasting data and update software by using software update data received as the broadcasting data, the apparatus comprising:
   a receiving portion operable to receive broadcasting data;
   a video processing portion and an audio processing portion respectively operable to process video data included in the received broadcasting data for video display and audio data included in the received broadcasting data for audio output based on stored software;
   an operation input portion operable to receive a user operation; and
   a control portion operable to (i) control the processing in the video processing portion and the audio processing portion, and (ii) cause software update processing on a necessary component by using received software update data if the received broadcasting data includes the software update data, during the software update processing, a first determination is made as to whether the operation input portion has received a user operation to start the apparatus and when a result of the first determination indicates that the operation input portion has received the user operation to start the apparatus a second determination is made as to whether the software processing currently being performed involves the control portion and when a result of the second determination indicates that the software processing currently being performed does not involve the control portion the apparatus is placed in a minimal power on state such that the apparatus is able to perform only minimal operations and when the result of the second determination indicates that the software processing currently being performed does involve the control portion the apparatus is not placed in the minimal power on state or in a normal power on state.

2. The broadcasting data receiving apparatus according to claim 1, in which after the apparatus is placed in the minimal power on state a third determination is made as to whether the software processing currently being performed involves the video processing portion and when a result of the third determination indicates that the software processing currently being performed does not involve the video processing portion causing a display to be provided to the user which indicates that software is being updated.

3. The broadcasting data receiving apparatus according to claim 2, in which the display is a text message.

* * * * *